United States Patent [19]
Bretton

[11] Patent Number: 4,772,139
[45] Date of Patent: Sep. 20, 1988

[54] LINER FOR BEARING ASSEMBLIES AND THE LIKE

[76] Inventor: Kenneth M. Bretton, 521 S. Beachwood Dr., Burbank, Calif. 91506

[21] Appl. No.: 100,193

[22] Filed: Sep. 23, 1987

[51] Int. Cl.$^4$ .................... F16C 43/00; F16B 2/22
[52] U.S. Cl. .................... 384/537; 384/535; 384/905; 403/29; 403/372
[58] Field of Search .................... 384/9, 215, 216, 276, 384/278, 295, 428, 447, 493, 495, 535–537, 557–559, 569, 581, 584, 585, 605, 905; 403/29, 30, 371, 372

[56] References Cited

U.S. PATENT DOCUMENTS

| | | | |
|---|---|---|---|
| 1,348,434 | 8/1920 | Marshick | 403/289 X |
| 1,370,599 | 3/1921 | Leon | 384/535 X |
| 1,386,255 | 8/1921 | Hindle et al. | 384/535 |
| 2,532,327 | 12/1950 | Parks | 384/581 |
| 2,534,142 | 12/1950 | Morton et al. | 384/535 |
| 2,700,581 | 1/1955 | Migny | 384/905 X |
| 2,926,051 | 2/1960 | Cazier et al. | 384/535 |
| 3,097,026 | 7/1963 | Sernetz | 384/535 |
| 3,467,451 | 7/1969 | Marley | 384/535 X |
| 3,976,340 | 8/1976 | Pitner | 384/581 |
| 4,139,317 | 2/1979 | Hafner | 384/535 X |
| 4,240,677 | 12/1980 | Payne et al. | 384/438 X |
| 4,496,252 | 1/1985 | Hörler et al. | 384/215 |

FOREIGN PATENT DOCUMENTS

| | | | |
|---|---|---|---|
| 2758741 | 7/1979 | Fed. Rep. of Germany | 403/372 |
| 0708079 | 1/1980 | U.S.S.R. | 384/535 |
| 1229470 | 5/1986 | U.S.S.R. | 384/276 |

*Primary Examiner*—Stuart S. Levy
*Assistant Examiner*—Thomas R. Hannon
*Attorney, Agent, or Firm*—Shlesinger Arkwright & Garvey

[57] ABSTRACT

A flexible liner for bearing assemblies and the like including a flexible sleeve having first and second sides and a plurality of first and second slots formed therein. The first slots are positioned adjacent the first side of the flexible sleeve. The second slots are disposed adjacent the second side of the flexible sleeve. The first slots are offset from the second slots such that no other first slot is aligned with a second slot. The first and second slots form a plurality of first and second tabs positioned on opposing sides of the flexible sleeve. The first tabs are offset from the second tabs so that the flexible liner exerts a continuous force about the outer periphery. The flexible liner further includes first and second layers. The first layer is formed from a material having a coefficient of expansion greater than material forming the second layer. Thus, the flexible liner expands or contracts directly proportional to the elements of the bearing assembly thereby compensating for changes in temperature.

16 Claims, 1 Drawing Sheet

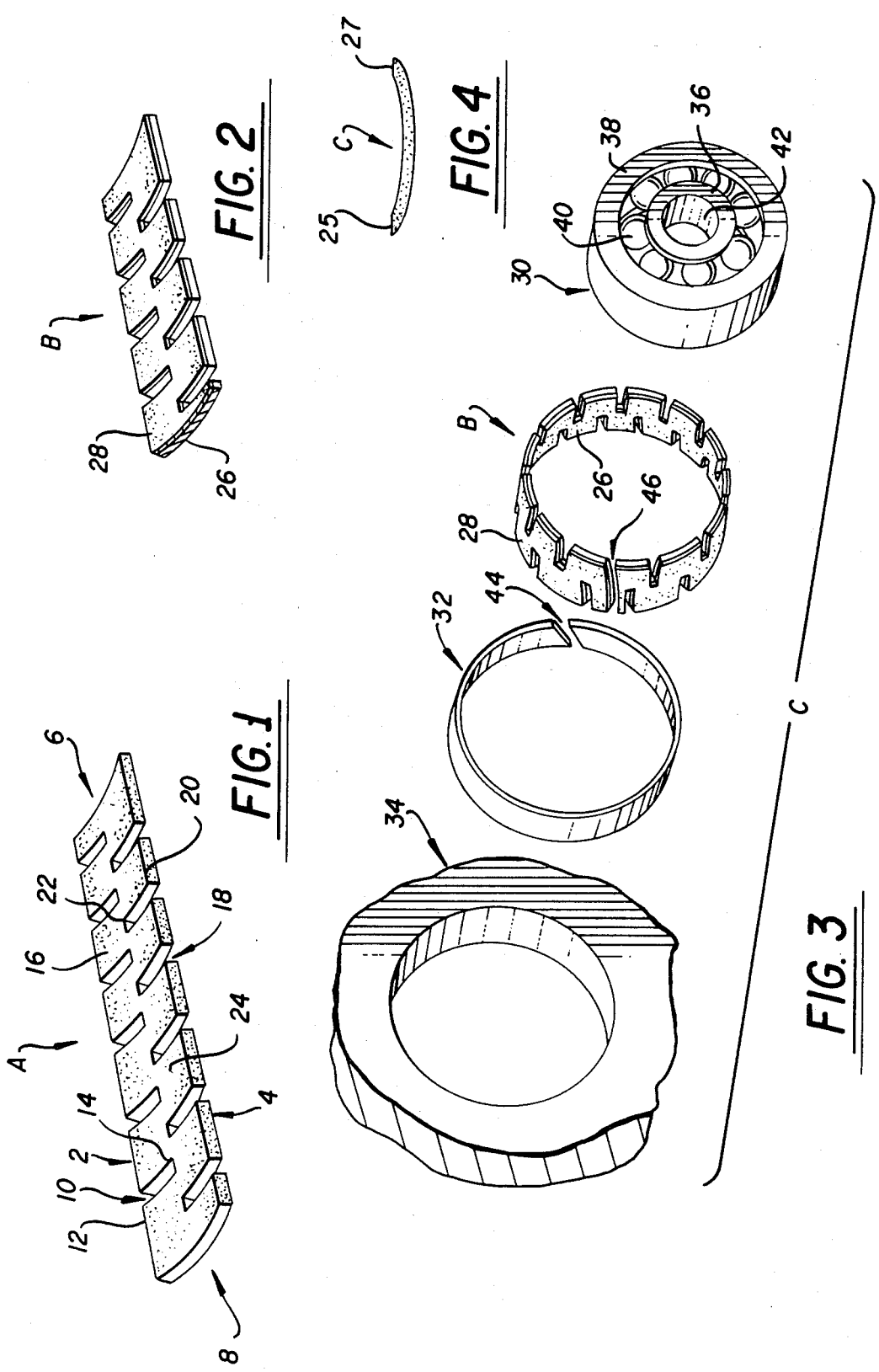

LINER FOR BEARING ASSEMBLIES AND THE LIKE

FIELD OF THE INVENTION

This invention pertains to liners for bearing assemblies and the like that compensate for spatial differences between compatible sub-components.

BACKGROUND OF THE INVENTION

Anti-friction bearing assemblies generally include a bearing and a bearing housing for supporting the bearing therein. Bearing assemblies are used in a wide variety of applications for mainly supporting rotating members. The aforementioned components of anti-friction bearing assemblies are generally formed from different types of material. Specifically the bearing housing is formed from either aluminum or magnesium alloys while the bearing is formed from steel. In anti-friction bearing assemblies it is preferable to approach a zero-gap between the bearing and the bearing housing. This has been achieved by pre-stressing the bearing housing. This method of obtaining a zero gap between the bearing assembly components has several significant disadvantages. The first is that the process is extremely expensive. Secondly, due to the different coefficient of expansions for steel and magnesium, the bearing and bearing housing will expand or contract at differing rates when the assembly is exposed to temperature variations. More specifically, when the assembly experiences a decrease in temperature the housing will contract more rapidly than the bearing. This will result in an unacceptable strickness between the bearing assembly components. Also, when the assemblies are exposed to an increase in temperature the housing will expand at a more accelerated rate than the bearing resulting in a gap between the components which will allow radial play between the same. This will result in undue wear on the bearing assembly. Further, the radial movement between the assembly elements could irreparably damage the rotating member supported by the bearing assembly. Therefore, it has been advantageous to minimize radial play between the compatible components of the bearing assembly.

As discussed above, it is normally advantageous to minimize radial play between the bearing assembly elements. However, it is desirable at times to permit controlled radial play between the bearing and the bearing housing. At high speeds, imperfections in the rotating element result in eccentric movement of the same. The eccentric motions of the rotating element exert an unbalanced force on the bearing housing. This will significantly accelerate the wear on the bearing assembly. Therefore, it has been desirable to dampen the eccentric motions of the rotating element. This can be achieved by permitting controlled radial play between the bearing and the bearing housing.

The following U.S. patents disclose a number of bearing assembly arrangements proposed to overcome the aforementioned concerns: U.S. Pat. Nos. 1,386,255 Hindle; 2,532,327 Parks; 2,534,142 Morton; 2,700,581 Migny; 2,926,051 Cazier; 3,097,026 Sernetz 4,139,317 Hafner; and 4,496,252 Horler.

The above-identified patents disclose a number of bearing assemblies that have been unable to effectively minimize radial play between the assembly components, adequately dampen the eccentric motion of the rotating element and acceptably compensate for changes in temperature.

OBJECTS AND SUMMARY OF THE INVENTION

An object of the present invention is to provide an improved bearing assembly.

Another object of the present invention is to provide a bearing assembly that can readily compensate for temperature changes.

A further object of the present invention is to provide a bearing assembly that can inexpensively and effectively minimize radial play between the assembly components.

Yet another object of the present invention is to provide a bearing liner that will exert a continuous force along the outer periphery of the bearing for maintaining proper alignment of the bearing and the bearing housing.

Another object of the present invention is to provide a bearing liner that can be readily inserted between the bearing and the bearing housing.

A further object of the present invention is to provide a bearing liner with an arcuate cross-section where the height of the arc varies directly proportional to the change in the radial distance between the outer periphery of the bearing and the inner diameter of the bearing housing resulting from a change in temperature.

Another object of the present invention is to provide a bearing liner with a plurality of interdigitated tabs formed in opposing sides thereof.

A still further object of the present invention is to provide a bearing liner that can be readily and inexpensively manufactured.

These and other objects of the invention will become readily apparent upon review of the present disclosure.

In summary, the present invention discloses a bearing assembly having a resilient liner for minimizing the radial play between the assembly components, dampening the eccentric motion of the rotating member and compensating for temperature changes in the surrounding environment.

DESCRIPTION OF THE DRAWINGS

FIG. 1 is a perspective view of the bearing liner formed in accordance with the present invention.

FIG. 2 is a fragmentary perspective view of an alternative embodiment of a bearing liner formed in accordance with the present invention.

FIG. 3 is an exploded view of the bearing assembly of the present invention.

FIG. 4 is a cross-sectional view of an alternative embodiment of a bearing liner formed in accordance with the present invention.

DETAILED DESCRIPTION OF THE INVENTION

FIGS. 1-3

Referring to FIG. 1, a bearing liner A is illustrated in the relaxed state. The bearing liner A is formed from a flexible sheet having sides 2 and 4 and ends 6 and 8. The bearing liner has an arcuate cross-section to achieve the desired spring rate. A plurality of substantially rectangular shaped slots 10 are formed in bearing liner A. The slots 10 each have first and second ends 12 and 14 respectively. The first end 12 is open and communicates with side 2 of bearing liner A. The second end 14 is closed and positioned inwardly from side 2 of bearing liner A. Slots 10 form a plurality of tabs 16. The tabs 16, in the preferred embodiment, are of uniform size and shape. It is readily apparent that the size and shape of the tabs 16 may be varied as desired.

A plurality of slots 18 are formed in the bearing liner A adjacent side 4. Slots 18 include first and second ends 20 and 22 respectively. First end 20 is open and communicates with side g. The second end 22 is closed and disposed inwardly of side 4. The slots 18 form a plurality of tabs 24. The tabs 24 are of generally the same size and configuration as tabs 16.

The slots 10 are offset from slots 18 along the longitudinal axis of the bearing liner A. Slots 10 and 18 extend substantially parallel to each other and ends 6 and 8 of bearing liner A. Further, slots 10 and 18 extend substantially perpendicular to sides 2 and 4 of bearing liner A.

The tabs 16 are disposed along side 2 of the bearing liner A such that they are substantially centered on the corresponding slots 18. Similarly, tabs 24 are formed in side 4 of the bearing liner A such that they are substantially centered on slots 10. This arrangement results in tabs 16 being offset along the longitudinal axis of the liner A from corresponding tabs 24 so that only a portion of tabs 16 overlap any one corresponding tab 24. Further, the opposing ends of tabs 16 overlap the corresponding tabs 24 positioned on opposite sides thereof.

Referring to FIG. 2, an alternative embodiment of a bearing liner formed in accordance with the present invention will now be described. The bearing liner B is substantially similar in configuration to bearing liner A illustrated in FIG. 1. Bearing liner B differs from bearing liner A only in that it is formed from two different material layers 26 and 28 thus forming a bi-metallic strip. In the preferred embodiment, the first layer 26 is typically formed from copper while the second layer 28 is typically formed from steel. The coefficient of expansion for copper is approximately $9.3 \times 10^{-6}$ while the coefficient of expansion for steel is between $6.1 \times 10^{-6}$ and $7.3 \times 10^{-6}$.

Referring to FIG. 4, a further embodiment of a bearing liner formed in accordance with the present invention will be described. The bearing liner C is substantially similar in configuration to bearing liner A. The bearing liner C differs from liner A in that ends 25 and 27 are chamfered. This provides the ends 25 and 27 with a greater area in contact with the housing of the bearing assembly.

THE BEARING ASSEMBLY

FIG. 3

The bearing assembly C includes a bearing 30, a bearing liner B (or alternatively bearing liner A), an anti-fretting ring 32 and a bearing housing 34. The bearing 30 includes an inner race 36, an outer race 38 and a plurality of balls 40. The bearing 30 further includes a cylindrical bore 42 for receiving a rotating shaft. While bearing 30 has been illustrated as having ball bearings 40 it is readily apparent that other types of bearings can be used such as roller bearings, or the like.

Anti-fretting ring 32 is inserted in the inner diameter of housing 34. Subsequently, the bearing liner B is inserted in the ring 32. Finally, the bearing 30 is inserted within bearing liner B. In the preferred embodiment, the arcuate cross-section of bearing liner B forms a convex arc with respect to bearing 30. Therefore, tabs 16 and 24 of the bearing liner B grip housing 34 and the crest/apex of the lower layer 26 of the bearing liner B abuts the outer surface of the anti-fretting ring 32. The convex curvature of liner B facilitates the assembly of the anti-friction bearing assembly C.

The anti-fretting ring 32 prevents housing 34 from experiencing undue wear. As previously mentioned, housings for anti-friction bearing assemblies are customarily formed from magnesium which is a comparatively soft material. Over a period of time tabs 16 and 24 of bearing liner A will erode housing 34 if in direct contact therewith. The anti-fretting ring 32 acts as a buffer between housing 34 and bearing liner B thereby minimizing the wear on housing 34. In instances where the housing 34 is formed from a relatively hard material there is no need for an anti-fretting ring 32.

Alternatively, the bearing liner B (or bearing liner A) can be inserted between housing 34 and bearing 30 such that the liner B forms a concave arc with respect to bearing 30. In this instance, the tabs 16 and 24 abut bearing 30 while the apex of the lower layer 28 abuts housing 34. In this embodiment, there is no need for an anti-fretting ring 32 because tabs 16 and 24 abut bearing 30 which is formed from steel. A bearing assembly having a bearing liner of this type is assembled by first inserting the bearing 30 in the bearing liner B. Subsequently, this sub-assembly is inserted into housing 34.

In the aforementioned embodiments, the tabs 16 and 24 are offset from each other along the longitudinal axis of the bearing liner B such that a continuous force is applied along the outer periphery of the bearing 30 or housing 34. More specifically the, opposing ends of the tabs 16 extend so that they overlap the corresponding tabs 24 positioned adjacent opposite end of tabs 16. This feature of the present invention ensures proper alignment of the bearing and bearing housing while permitting only limited radial play therebetween. Additionally, the arcuate cross-section of the bearing B provides a spring effect to further ensure radial alignment of the bearing assembly components. The arcuate cross-section and slots 10 and 18 provide the bearing liner B with the necessary resiliency for dampening the eccentric motions of the rotating member supported by the bearing assembly C.

The anti-fretting ring 32 includes a skewed/angled slit 44 formed therein. At a position diametrically opposite that of slit 44, bearing liner B has a straight slit 46 formed therein. The skewed/angled slit 44 prevents the ends of anti-fretting ring 32 from engaging or otherwise interfering with the ends of bearing liner B in the event that slits 44 and 46 become aligned.

As previously mentioned, the bearing housing 34 is commonly formed from either magnesium or aluminum alloys while the bearing is formed from steel. The coefficient of expansions for magnesium and aluminum are $23.1 \times 10^{-6}$ and $26 \times 10^{-6}$ respectively. The coefficient of expansion for steel, on the other hand, ranges from $6.1\text{-}7.3 \times 10^{-6}$. Therefore, as the bearing assembly C experiences a change in temperature, the housing 34 will expand or contract at a more accelerated rate than the bearing 30. This will result in a gap between the outer bearing and bearing liner greater than the combined thickness of the ring 32 and the bearing liner B. The present invention compensates for this by forming bearing liner B from a layer of copper 26 and a layer of steel 28. As previously noted, the coefficient of expansion for copper is greater than that of steel. Thus, the copper layer will expand or contract more rapidly than the steel layer. This will cause a change in the height of the arcuate cross-section of the bearing liner B. The change in the height of the arc of bearing liner B is directly proportional to the change in the radial gap or space intermediate the bearing and bearing housing. Thus, the bearing liner B can readily compensate for contraction or expansion of the bearing assembly components resulting from a change in temperature.

It should be noted that the materials of copper and steel are used only for purposes of an example of materials having differing coefficients of expansion. It is clear that other materials may be used as the specific needs vary provided that the coefficient of expansions are such that the arc of the bearing liner varies directly proportional to the change in the gap between the bearing the bearing housing.

While this invention has been described as having preferred design, it is understood that it is capable of further modification, uses and/or adaption of the invention foliowing in general the principal of the invention and including such departures from the present disclosure as come within the known or customary practice in the art to which the invention pertains, and as may be applied to the central features set forth, and fall within the scope of the invention of the limits of the appended claims.

I claim:

1. A liner bearing assemblies and the like, comprising:
   (a) a flexible sleeve having first and second sides;
   (b) said sleeve including a plurality of first slots having first and second ends;
   (c) said first end of said first slots being open and communicating with said first side of said flexible member;
   (d) said sleeve including a plurality of second slots having first and second ends;
   (e) said first end of said second slots being open and communicating with said second side;
   (f) at least one of said first slots being offset from at least one of said second slots and wherein none of said first slots are aligned with said second slots; and
   (g) said second ends of said first and second slots are positioned on substantially a common line.

2. A liner as in claim 1, wherein:
   (a) said flexible member has an arcuate cross section.

3. A liner as in claim 1 wherein:
   (a) said first and second slots are of substantially equal in length.

4. A liner as in claim 1, wherein;
   (a) said sleeve includes ends; and
   (b) said ends are spaced from each other to form a slit.

5. A liner as in claim 4, wherein:
   (a) said ends of said sleeve form a straight slit.

6. A liner as in claim 1, wherein:
   (a) said first and second sides are chamfered.

7. A linear as in claim 1, wherein:
   (a) said flexible member includes first and second layers;
   (b) said first layer is formed from a first material and said second layer is formed from a second material; and
   (c) said first material has a coefficient of expansion greater than said second material.

8. A liner for bearing assemblies and the like comprising:
   (a) a flexible sleeve having first and second sides;
   (b) said sleeve including a plurality of first slots having first and second ends;
   (c) said first end of said first slots being open and communicating with said first side of said flexible member;
   (d) said sleeve including a plurality of second slots having first and second ends;
   (e) said first end of said second slots being open and communicating with said second side;
   (f) at least one of said first slots being offset from at least one of said second slots and wherein none of said first slots are aligned with said second slots;
   (g) said flexible member includes first and second layers;
   (h) said first layer is formed from a first material and said second layer is formed from a second material; and
   (i) said first material has a coefficient of expansion greater than said second material.

9. A liner as in claim 8, wherein:
   (a) said flexible member has an arcuate cross-section.

10. A linear as in claim 8, wherein:
    (a) said first and second slots are substantially equal in length.

11. A linear as in claim 8, wherein:
    (a) said sleeve includes ends; and
    (b) said ends are spaced from each other to form a slit.

12. A linear as in claim 11, wherein:
    (a) said ends of said sleeve form a straight slit.

13. A linear as in claim 8, wherein:
    (a) said first and second sides are chamfered.

14. A linear for bearing assemblies and the like, comprising:
    (a) flexible sleeve having first and second sides;
    (b) said sleeve including a plurality of first slots each having first and second ends;
    (c) said first end of said first slots being positioned adjacent said first side of said flexible sleeve;
    (d) said sleeve including a plurality of second slots each having first and second ends;
    (e) said first end of said second slots being positioned adjacent said second side of said flexible sleeve;
    (f) at least one of said first slots being offset from a corresponding second slot along the longitudinal axis of said flexible sleeve;
    (g) said first end of at least one of said first slots being open and communicating with said first side of said flexible sleeve;
    (h) said first end of at least one of said second slots being open and communicating with said second side of said flexible sleeve; and
    (i) said second ends of said first slots and said second ends of said second slots being positioned on substantially a common line.

15. A liner to reduce play in bearing assemblies and the like, comprising:
    (a) a flexible sleeve having a longitudinal axis and an arcuate cross-section transverse to said longitudinal axis;
    (b) said flexible sleeve having first and second layers;
    (c) said first layer being formed from a material having a first coefficient of expansion;
    (d) said second layer being formed from a material having a second coefficient of expansion;
    (e) said first layer being substantially equal in size to said second layer and secured thereto; and
    (f) said first coefficient of expansion is greater than said second coefficient of expansion whereby when said flexible sleeve experiences a temperature change, said first layer will expand or contract more readily than said second material layer causing a change to occur in the height of said arcuate cross-section thereby minimizing the play in the bearing assembly.

16. A liner as in claim 15, wherein:

(a) said flexible sleeve has a concave cross-section;
(b) said first layer forms the outer periphery of said sleeve; and
(c) said second layer forms the inner periphery of said sleeve.

* * * * *